United States Patent [19]
Neri

[11] Patent Number: 5,479,795
[45] Date of Patent: Jan. 2, 1996

[54] FISH-HOOK CLASP

[76] Inventor: Danilo Neri, 285, Via La Fontina, I-52033 Caprese Michelangelo (AR), Italy

[21] Appl. No.: 208,682

[22] Filed: Mar. 11, 1994

[30] Foreign Application Priority Data

Apr. 29, 1993 [IT] Italy ................ AR93A0010

[51] Int. Cl.⁶ .................................................. A44C 25/00
[52] U.S. Cl. ........................ 63/2; 24/599.6; 63/26
[58] Field of Search ................ 24/599.1, 599.4, 24/599.6, 599.7, 599.8; 63/2, 26

[56] References Cited

U.S. PATENT DOCUMENTS

| | | | |
|---|---|---|---|
| 896,666 | 8/1908 | Rosson | 24/599.1 |
| 1,251,415 | 12/1917 | Prentice | 24/599.4 |
| 1,263,745 | 4/1918 | Craven | 24/599.1 |
| 2,531,325 | 11/1950 | Cesaris | 24/599.7 |
| 4,340,999 | 7/1982 | Chini | 24/599.4 |
| 4,972,697 | 11/1990 | Andrea . | |

FOREIGN PATENT DOCUMENTS 523953  8/1921  France ................ 24/599.7

*Primary Examiner*—Michael J. Milano
*Attorney, Agent, or Firm*—Young & Thompson

[57] ABSTRACT

A fish-hook clasp has a casing (1, 2) and a rotating pawl (7) containing a housing (4) and an indentation (9) for a wedge-shaped or pointed part of a back of a decorative element (13) which acts as a journal for the pawl (7) and which is held in place in a U-shaped band (15) that creates a posterior ring-like shape for hooking the clasp on. This band (15) has a hole (16) through which the decorative element (13) is displayed.

6 Claims, 1 Drawing Sheet

FISH-HOOK CLASP

BACKGROUND OF THE INVENTION

1. Field of the Invention

The invention regards a fish-hook clasp, used as an openable fastening to connect the ends of necklaces and bracelets, therefore intended for use in the gold, silver and costume jewellery fields in general.

2. Description of the Related Art

There already exist fish-hook clasps consisting of an outer casing that is sheared or precision cast, and a pawl that is pushed into the closed position by a spring. In one model these parts are held together by a pin that passes through them and is riveted at the end; in another example they are linked by two pins which protrude from the pawl and correspond with the latter's axis and which are designed to rest in two corresponding indentations on the internal surfaces of the outer casing; in another example they are held together by two opposing elements which protrude from the inside facing surfaces of the casing and which fit into two corresponding indentations dug out of the internal rotating boss of the pawl.

The external casing of the clasp is thin in order to be light and its visible surface is flat or grooved to lighten it. What is more, the outer casing is designed in such a way that at one end there is a hook-shaped extension which creates the ring-shape that can be opened and at the other end there is a closed ring-shape that is used to connect the clasp to the chain.

Existing fish-hook clasps are easy to operate and thus convenient to use; however they do not have decorative additions due to the thinness of their casing which renders them unsuitable to be applied to valuable necklaces or bracelets with rich decorative additions and precious stones.

SUMMARY AND OBJECTS OF THE PRESENT INVENTION

The object of the current invention is to overcome such limitations and thereby to produce a fish-hook type clasp which is safe and easy to operate, to make this clasp with a light casing like that of similar clasps in existence today and to devise it in such a way that it is possible to apply decorative stones, even of considerable size or other types of decorative additions such as the heads of screws, that are incorporated in the clasp and therefore of minimum protrusion without this diminishing or altering the operation of the same. At the same time, such additions make the clasp more valuable, rendering it suitable for use in the jewellery field.

These aims can be achieved with the object of the current inventon which takes the form of a fish-hook type clasp with casing and pawl containing coaxial housings for both a decorative element with a wedge-shaped or pointed back intended to act as a journal for the pawl and a "U"-shaped band equipped with at least one hole through which the decorative element held there is displayed.

The clasp in question therefore has a functional decorative addition, which could be a stone or other decorative element, the back of which serves as a journal, (whereas its application normally constitutes an encumbrance), thus avoiding both troublesome protrusions and obstacles affecting the opening and closing mechanism. The decoration is held in place in its casing by a "U"-shaped band fixed to the casing. This is usually shaped in such a way that it creates the posterior ring-shape for connecting the clasp and is provided with a hole through which the same decorative element is displayed, making it possible to enrich and increase the value of the clasp even with quite large adornments.

BRIEF DESCRIPTION OF THE DRAWINGS

The invention is described in detail below with references to the illustrative drawings on the attached sheet, where.

DETAILED DESCRIPTION OF THE PREFERRED EMBODIMENT

Figure 1:
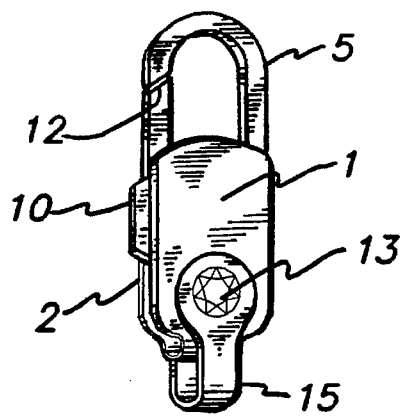
FIG. 1 is the view in perspective of the clasp.
Figure 2:
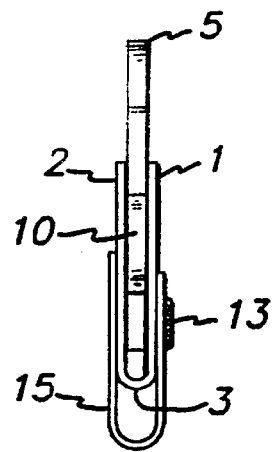
FIG. 2 is the lateral view of the operating side.
Figure 3:
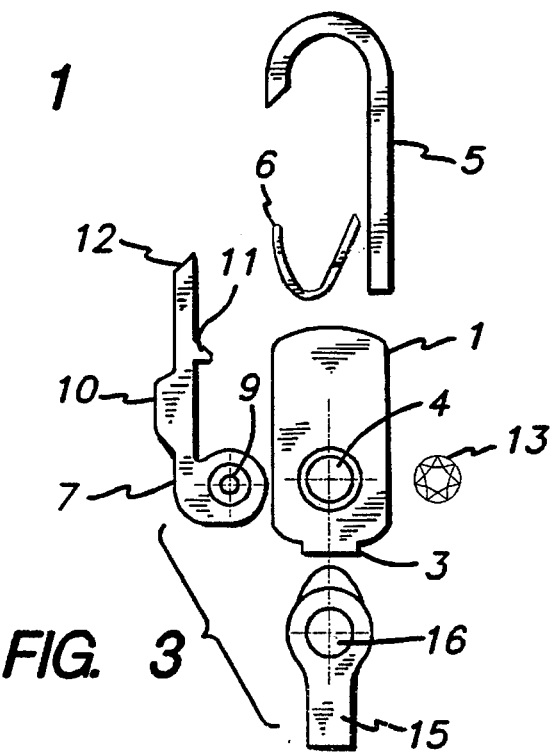
FIG. 3 is the exploded front view.
Figure 5:
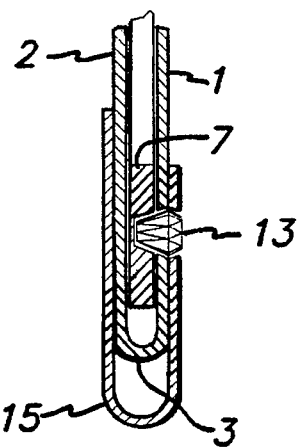
FIG. 5 is a cross-sectional side view in a different scale from the central body of the clasp with the decorative element consisting of a brilliantine.

It is understood that the drawings serve only to illustrate the ideal concrete model of the subject of the invention without constituting a limitation of the same.

In these drawings, the numbers 1 and 2 refer to the two facing wings; the number 3 is the loop which links them; 4 is the housing on the wing 1; 5 is the hook-shaped part; 6 is the spring; 7 is the rotating pawl with base equipped with an indentation 9, operating nub 10, stop tooth 11 for the spring 6, and end 12 shaped so it interacts with the free end of the hook 5 to create the openable ring-shape to hook on the clasp. The numeral 13 represents the decorative element with a pointed or wedge-shaped protrusion which, in any case, is shaped so it can be housed in the housings 4 and indentations 9 and act as a journal for the pawl 7. The numeral 15 shows the "U"-shaped band with at least one wing with hole 16 through which the front of the decorative element 13 is brought into view.

The two wings 1 and 2 of the casing are facing each other at a distance that is slightly more than that of the pawl 7 whose indentation 9 is in a coaxial position to the housing 4 so that the back part of the element 13 holds the pawl 7 in position, guiding its rotation.

Figure 4:
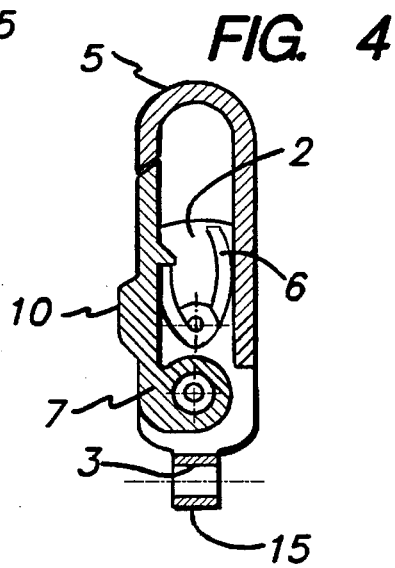
FIG. 4 is the front view of the clasp showing how it works, its front casing and band with decorative stone having been removed.

The hook 5 is shown as being separate from the casing 1, 2 and loop 3, but it could be made by shearing or bending a plate together with the same casing 1, 2. In the examples shown, it is fixed onto the casing 1, 2 by soldering in the position illustrated in FIG. 4.

The pawl 7 has the tooth 11, favourably shaped like a saw tooth, to facilitate both the insertion of the "V"-shaped or equivalent brooch-type spring 6 and to stop it from coming out of its resting place during use.

This pawl 7 normally has a single recess like indentation 9, but there is nothing to prevent the addition of another coaxially opposed recess. The same applies to the housing 4 on the casing 1, 2 and the hole 16 on the band 15. The latter has the advantage of having the facing sides in close proximity, or rather at a distance that is inferior to the thickness of the casing 1, 2 and is usually made from a metal strip with soldering flux along its side. In this way once the pawl 7 is inserted in the casing 1, 2 and loop 3 and the stone or other decorative feature 13 is put in, the band 15 is clipped on and holds the assembled pieces and components until they are heated and soldered to the casing, thus providing stable working positions for the stone and the pawl 7.

Obviously the hole 16 is made to hold the stone in the housing 4 on the casing 1, 2 and is therefore tapered to exert pressure along the surface of the stone or other decorative element 13 in the housing 4. Once the pawl 7, casing 1, 2, loop 3, stone or other decorative element 13, and the band 15 have been assembled, the spring 6 is inserted. This is spring 6 shaped so that its prong cannot move out of its working position due to the tooth 11 on the pawl 7 constantly pushing it towards the closed position.

The invention therefore consists of a casing 1, 2 and pawl 7 equipped, on one or both opposing sides, with housings 4 and indentations 9 designed to hold the wedge-shaped back of stones or the tang of similarly decorative elements 13 or additions.

The casing 1, 2 and the hook-shaped extension 5 of the clasp could be two separate parts joined by soldering, or could be a single piece of metal plate that has been sheared and bent.

Furthermore the clasp includes the U-shaped band 15, whose profile can be variable. This band 15 is provided with hole(s) 16 on one or both surfaces through which can be seen the decorative element 13 which act as a journal for the pawl 7.

The latter has a small protrusion 10 that sticks out from the rotating arm between its rotational axis and the end 12 which is intended to facilitate its working.

On the inside of the pawl 7, there emerges the tooth 11 designed to facilitate both the insertion of the spring 6 and to prevent it from sliding out of position.

The spring 6 could be V-shaped or like that of a brooch and is housed loose inside the casing 1, 2, that is, without a positioning pin or journal.

The U-shaped band 15 is soldered onto the surfaces of the wings 1 and 2 of the casing in such a position that the holes 16 are coaxial with the housings 4 and indentations 9 on the casing and the pawl 7.

The clasp could be made out of any type of metal, its parts being the same or different with one or both of the facing surfaces of the wings 1 and 2 of the casing having a decorative addition whose back passes through the same casing.

I claim:

1. A fish-hook clasp used as an openable fastening to connect the ends of necklaces and bracelets intended for use in jewelry fields in general, comprising:

a casing having facing wings (1, 2) and a connecting loop (3);

a rotating pawl (7) with an indentation (9);

a housing (4) formed in one of the wings (1, 2) and aligned coaxially with the indentation (9) for operative cooperation with the rotating pawl (7);

a decorative element (13) with a back which acts as a journal for the rotating pawl (7) and which is held in place at the back by the housing (4) and the indentation (9); and a U-shaped band (15) provided with at least one hole (16) through which the decorative element (13) is displayed.

2. A fish-hook clasp according to claim 1, further comprising a hook-shaped part (5) which is connected to the casing.

3. A fish-hook clasp according to claim 2, wherein:

said rotating pawl (7) has an operating nub (10) protruding from an external edge on an arm, said nub (10) being positioned between the indentation (9) and a free end (12) of the rotating pawl (7).

4. A fish-hook clasp according to claim 3, wherein:

said rotating pawl (7) has a stop tooth (11) on an internal edge of the arm, said tooth (11) being positioned between the indentation (9) and the free end (12) of the rotating pawl (7).

5. A fish-hook clasp according to claim 4, further comprising:

a spring (6) having one end in sliding contact with an internal edge of the hook-shaped part (5) and another end in contact with the stop tooth (11).

6. A fish-hook clasp according to claim 1, further comprising a spring (6) housed inside the casing.

* * * * *